United States Patent [19]
Zoeller

[11] Patent Number: 5,985,139
[45] Date of Patent: Nov. 16, 1999

[54] SEPTIC TANK PUMP AND FILTER SYSTEM

[75] Inventor: Kenneth E. Zoeller, Louisville, Ky.

[73] Assignee: Zoeller Company, Louisville, Ky.

[21] Appl. No.: 09/013,333

[22] Filed: Jan. 26, 1998

[51] Int. Cl.[6] ........................... B01D 17/12; B01D 29/39; B01D 29/90; B01D 35/02

[52] U.S. Cl. ...................... 210/85; 210/136; 210/416.1; 210/456; 210/488; 210/532.2

[58] Field of Search ................. 210/85, 86, 136, 210/311, 314, 416.1, 454, 455, 456, 532.1, 532.2, 97, 109, 121, 488, 497.01

[56] References Cited

U.S. PATENT DOCUMENTS

| | | |
|---|---|---|
| 2,900,084 | 8/1959 | Zabel . |
| 2,987,186 | 6/1961 | Burgdon ............................... 210/532.2 |
| 3,332,552 | 7/1967 | Zabel . |
| 4,439,323 | 3/1984 | Ball ........................................ 210/608 |
| 4,710,295 | 12/1987 | Zabel ..................................... 210/336 |
| 5,207,896 | 5/1993 | Graves ................................... 210/109 |
| 5,264,120 | 11/1993 | Graves ................................... 210/109 |
| 5,382,357 | 1/1995 | Nurse .................................... 210/170 |
| 5,482,621 | 1/1996 | Nurse .................................... 210/170 |
| 5,492,635 | 2/1996 | Ball ....................................... 210/802 |
| 5,569,387 | 10/1996 | Bowne et al. ......................... 210/754 |
| 5,580,453 | 12/1996 | Nurse, Jr. ............................. 210/323.2 |
| 5,582,716 | 12/1996 | Nurse, Jr. .............................. 210/121 |
| 5,591,331 | 1/1997 | Nurse, Jr. .............................. 210/232 |
| 5,690,824 | 11/1997 | Stuth .................................. 210/333.01 |
| 5,763,790 | 6/1998 | Zoeller ................................... 210/238 |
| 5,885,452 | 3/1999 | Koteskey ............................. 210/416.1 |

*Primary Examiner*—Joseph W. Drodge
*Attorney, Agent, or Firm*—Scott R. Cox

[57] ABSTRACT

A pump and filter system for filtering effluent in a septic system including a filter housing with sides, a top and a bottom, a filtering system secured within the filter housing, a vertical tubular element secured to the outside of the filter housing in communication with unfiltered effluent within the septic system and with an opening in the bottom or side of the filter housing, and a pump for pumping filtered effluent through the filtering system. Preferably a check valve is secured within the bottom of the filter housing.

14 Claims, 6 Drawing Sheets

SEPTIC TANK PUMP AND FILTER SYSTEM

BACKGROUND OF INVENTION

This invention relates to devices used for the treatment of waste water. More specifically, this invention relates to a pump and filter system used for the filtering of liquid effluent contained in a septic tank.

Waste water discharged from commercial or residential property contains both liquid and solid wastes which are typically collected in a waste water collector, such as a septic tank. In such septic tanks, the liquid and solids are generally distributed into three layers: an upper horizontal scum layer, a lower horizontal sludge layer, and a relatively clear, horizontal effluent layer located between the two other layers. During operation of these septic tanks, liquids from this horizontal effluent layer are intermittently discharged from the septic tanks. During such discharge the solids contained within the septic tanks are preferably retained in the septic tanks to be decomposed during the normal operation of the system. Intermittently, the septic tanks are cleaned to remove any excess solids contained therein.

During normal operations, some solids become mixed into the relatively clear horizontal effluent layer. These solids often migrate into this layer on gas bubbles produced during decomposition of solid material contained in the lower sludge layer. These solids will be discharged with the effluent if not filtered out of the effluent. Excess solids discharged with the effluent may gradually degrade the effectiveness of the entire septic system.

To reduce the likelihood of discharge of solids from the septic tank, a number of different types of filtering devices for the liquid effluent have been developed. For example, cylindrical mesh screen filtering systems which surround a gravity flow outlet system and discharge pump are disclosed in U.S. Pat. Nos. 5,207,896 and 4,439,323.

The effluent flows into the filtering system generally through openings in the side walls of the filter system which are designed to match up with the relatively clear, horizontal effluent layer. For example, the devices of U.S. Pat. Nos. 5,492,635 and 4,439,323 utilize a plurality of openings in the walls of the filtering system with these openings designed to be placed within the relatively clear, horizontal effluent layer.

Other devices placed within a septic tank which use a filtering system different from a mesh screen are disclosed, for example, in U.S. Pat. Nos. 5,482,621 and 5,382,357. These patents disclose filtration of the effluent using a specific flow pattern for the effluent through an open bottom of a filter element, out the sides of the filter element through an annular space adjacent to the filter element, and finally to a discharge opening of the device for discharging filtered effluent from the septic tank.

Other systems for filtering solids from the effluent of a septic system utilizing a stacked disk dam system as the filtering system are disclosed in U.S. Pat. Nos. 5,582,716, 5,207,896, 4,710,295, 3,332,552 and 2,900,084. See also U.S. Pat. No. 5,264,120 which utilizes both a mesh screen and a disk dam system to filter the effluent. See also U.S. Pat. No. 5,690,824 which utilizes a series of stacked mesh filters.

U.S. Pat. No. 5,591,331 discloses a different filtering system comprising a plurality of vertically extending removable side walls, each of which contains a filtering screen for filtering the effluent.

A filter system containing a removable filter with diagonal slits for filtering effluent present in a septic system is disclosed in U.S. Pat. No. 5,569,387.

In addition to systems which utilize a single filter element within a filter system, multiple filter element systems for filtering effluent in a septic system are disclosed in U.S. Pat. Nos. 5,580,453 and 5,492,635. Each of these patents mandates a specific flow pattern for the effluent entering the filter system and exiting through a discharge opening in the housing of the filter system.

Because of limitations on the flow of the effluent through these systems, problems may arise from clogging of the filters which necessitates frequent cleaning of these systems. In addition, some of the screen filter systems can collapse even in normal use, also necessitating cleaning and/or replacement.

Thus, a need exists for a more effective system for filtering solids from the effluent of a septic system which overcomes the problems present in prior art systems.

Accordingly, it is an object of this invention to disclose a pump and filter system for filtering effluent present in a waste water system.

It is a further object of this invention to disclose a pump and filter system utilizing a tubular element containing an opening which is in communication with the relatively clear, horizontal effluent layer, which opening permits the effluent to flow into the pump and filter system.

It is a further object of this invention to disclose a pump and filter system for filtering effluent from a waste water system where the filter system contains a significant amount of filtering surface, thus reducing the likelihood of clogging of the filters during normal operation.

It is a further object of this invention to disclose a pump and filter system containing multiple filter elements which are easy to clean and replace.

It is a further object of this invention to disclose a pump and filter system where the pump is located adjacent to the filter elements.

It is a further object of this invention to disclose a shoulder seal secured within the filter housing which supports a filter element holder for the filter elements and which seals the filter element holder and filter elements in place within the pump and filter system.

It is a further object of this invention to disclose a check valve located in the bottom of the filter housing which when opened permits accumulated particulates within the pump and filter system to be flushed out of the system.

These and other objects and features of the present invention will become apparent to those skilled in the art from a consideration of the following detailed description, drawings and claims. The description, along with the accompanying drawings, provides a selected example of construction of the device to illustrate the invention.

SUMMARY OF INVENTION

In accordance with the present invention there is provided a pump and filter system for filtering liquid effluent contained in a waste water system comprising (a) a filter housing with sides, a top and a bottom, (b) a filtering system secured within the filter housing, (c) a tubular element secured to the outside of the filter housing in communication with the unfiltered effluent within the septic system and with an opening in the bottom or side of the filter housing, and (d) a pump located within the filter housing for pumping filtered effluent out of the filtering system.

In a preferred embodiment, the filtering system contains a plurality of filter elements, each with a top, bottom and sides, wherein the bottom of each filter element is closed to prevent flow of effluent through the bottom of the filter element, and wherein each filter element contains a filtering system for filtering solids from the liquid effluent. Preferably, the filter elements are secured to a filter element holder which is secured to the inside wall of the filter housing, preferably using a shoulder seal contained in the filter housing. In a further preferred embodiment, a separation element, preferably separation rings, is secured to at least one of the filter elements for separating at least one of the filter elements from other filter elements, which rings do not substantially inhibit the flow of liquid effluent through the filtering system. The filter element holder is secured against the inside surface of the filter housing to prevent effluent from being discharged from the pump and filter system without first passing through the filter elements. In addition, there is preferably provided a check valve in the bottom of the filter housing which when opened permits particulates accumulated in the bottom of the pump and filter system to be flushed out of the system.

In a preferred embodiment the flow of the effluent through the pump and filter system first enters an opening provided in the tubular element, passes downward within the tubular element along the side of the filter housing and then enters the filter housing through an opening in the bottom or side of the filter housing. The unfiltered effluent then passes upward through the filter elements and out the top of each filter element and then downward around the pump. The filtered effluent then enters an opening provided in the bottom of the pump where it is then pumped out of the filter housing through a discharge opening.

BRIEF DESCRIPTION OF THE DRAWINGS

This invention will now be described with reference to the accompanying drawings in which.

DETAILED DESCRIPTION OF THE PREFERRED EMBODIMENT

Figure 1:
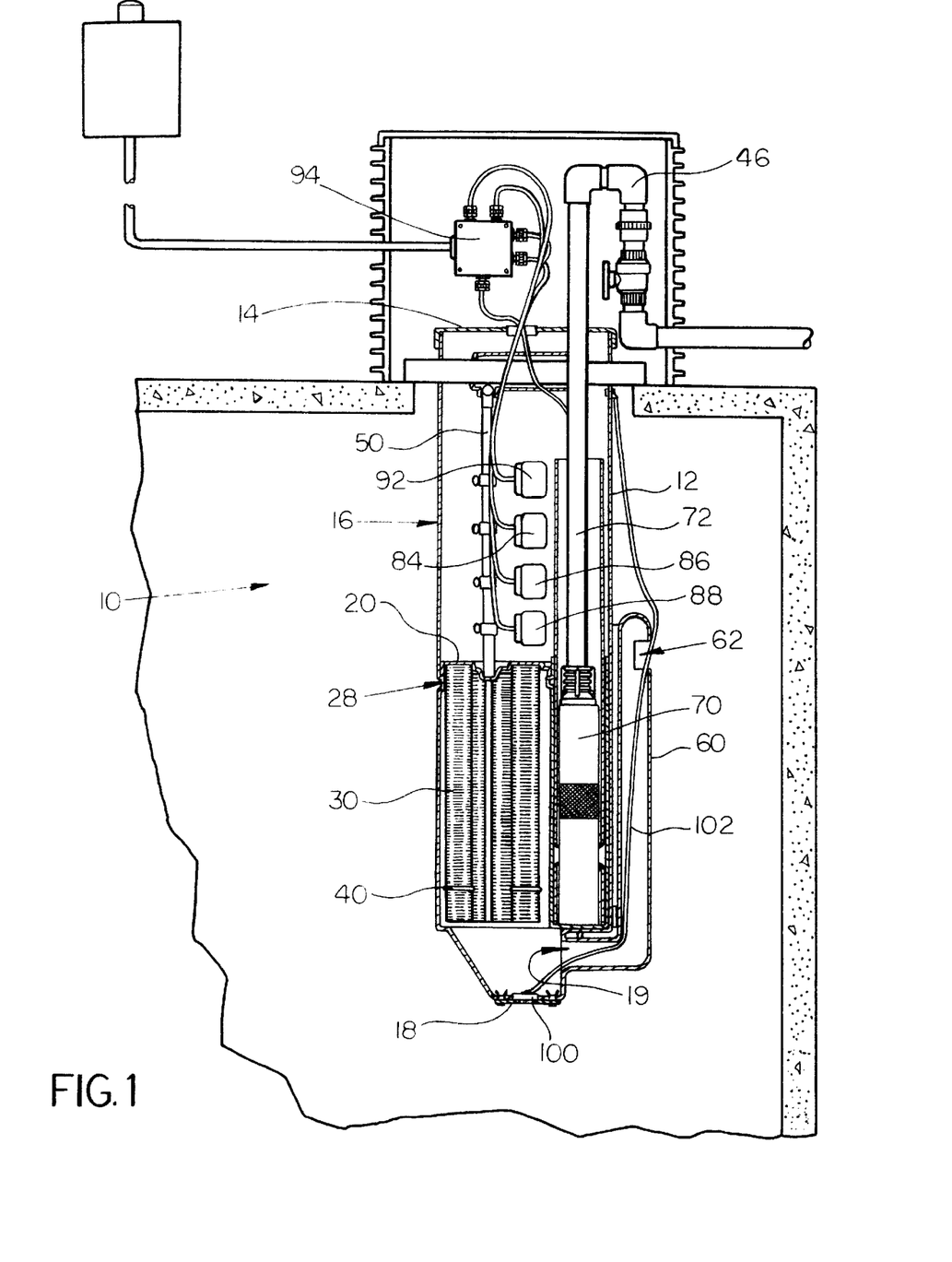
FIG. 1 is a cutaway side view of the pump and filter system.
Figure 2:
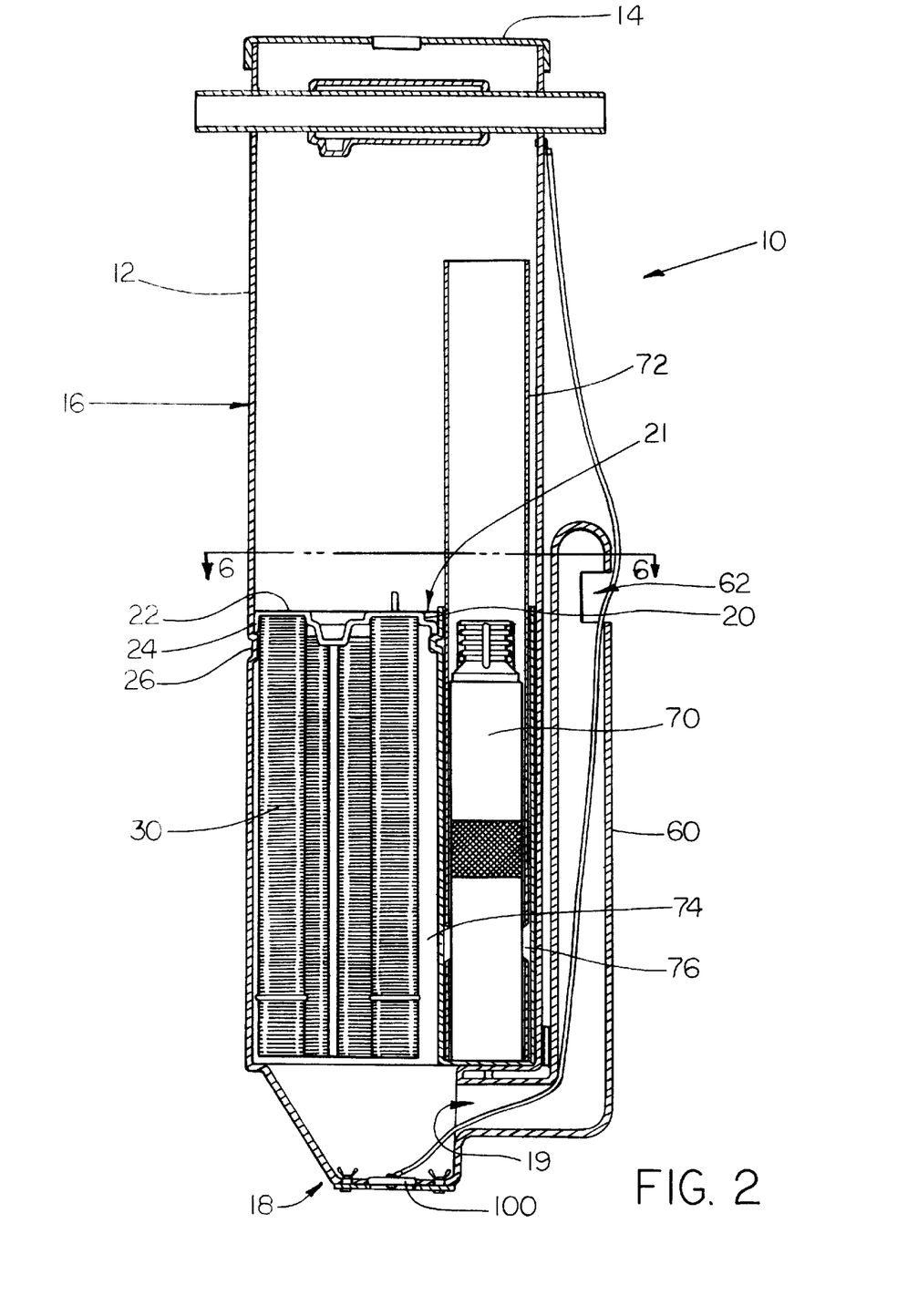
FIG. 2 is a cutaway side view of the pump and filter system with the discharge system, control system and alarm system removed.
Figure 3:
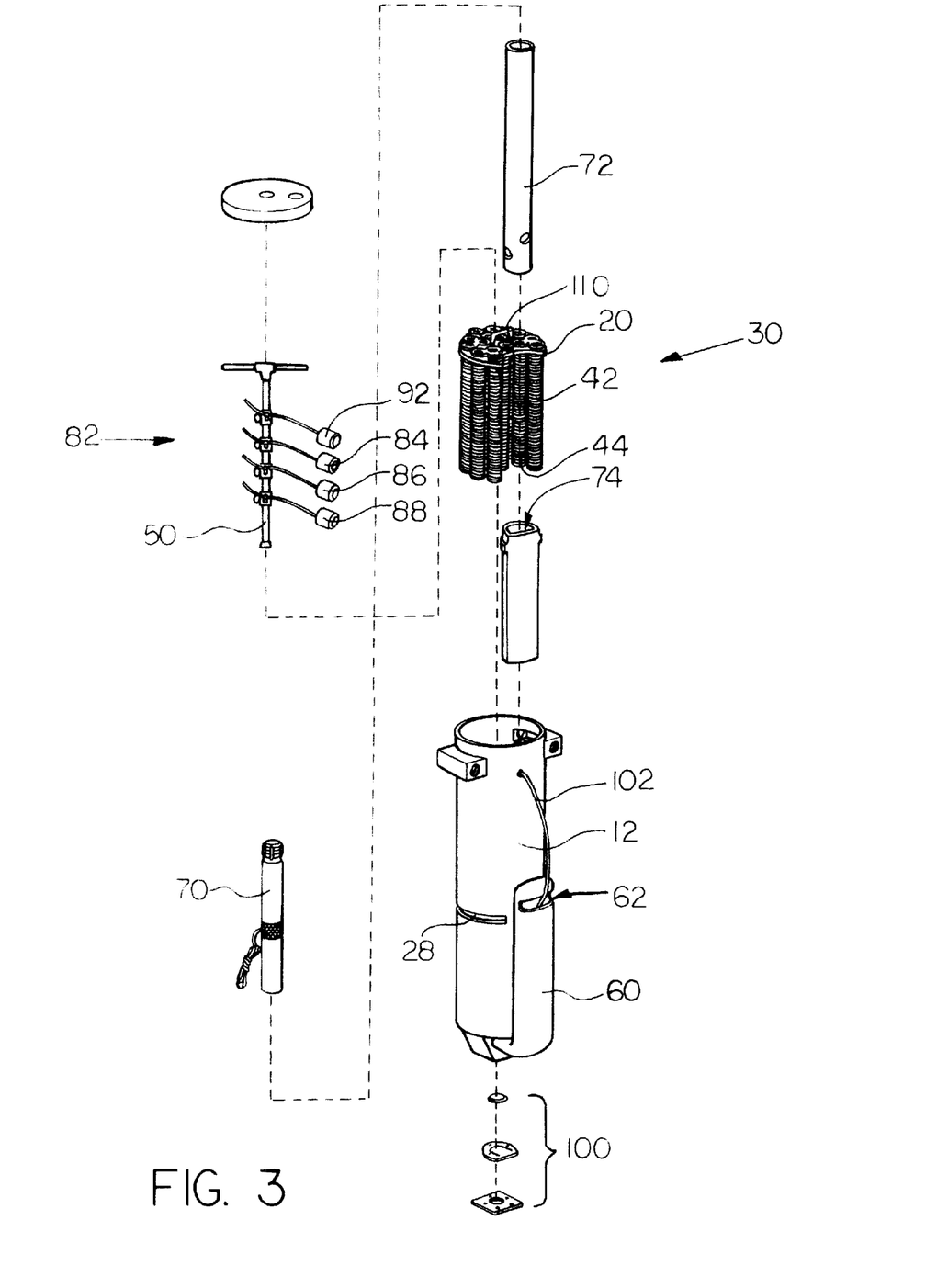
FIG. 3 is an exploded view of the pump and filter system.

Although the invention is adaptable to a wide variety of uses, it is shown in the drawings for purpose of illustration as embodied in FIGS. 1, 2 and 3 in a pump and filter system (10) for filtering liquid effluent in a waste water system, preferably a septic tank system. This pump and filter system (10) is comprised of a filter housing (12), a filter element holder (20) secured within the filter housing (12), a plurality of filter elements (30) secured to the filter element holder (20), a tubular element (60) secured to the outside of the filter housing (12), a separation element, preferably one or more separation rings (40) for maintaining at least one filter element apart from other filter elements, and a pump (70) for discharging filtered liquid effluent from the filter housing (12), which pump (70) is located generally adjacent to the filter elements (30).

The pump and filter system (10) is utilized within a waste water collection container, preferably a septic tank. The septic tank typically receives raw sewage and waste water from a residence or commercial facility. During normal operation, solids received distribute into a lower sludge layer or an upper horizontal scum layer. Contained between these two layers is the generally horizontal, effluent layer. The pump and filter system (10) is designed to filter liquid drawn from this horizontal effluent layer to remove solids from the effluent so that filtered effluent may be discharged from the septic system.

Figure 4:
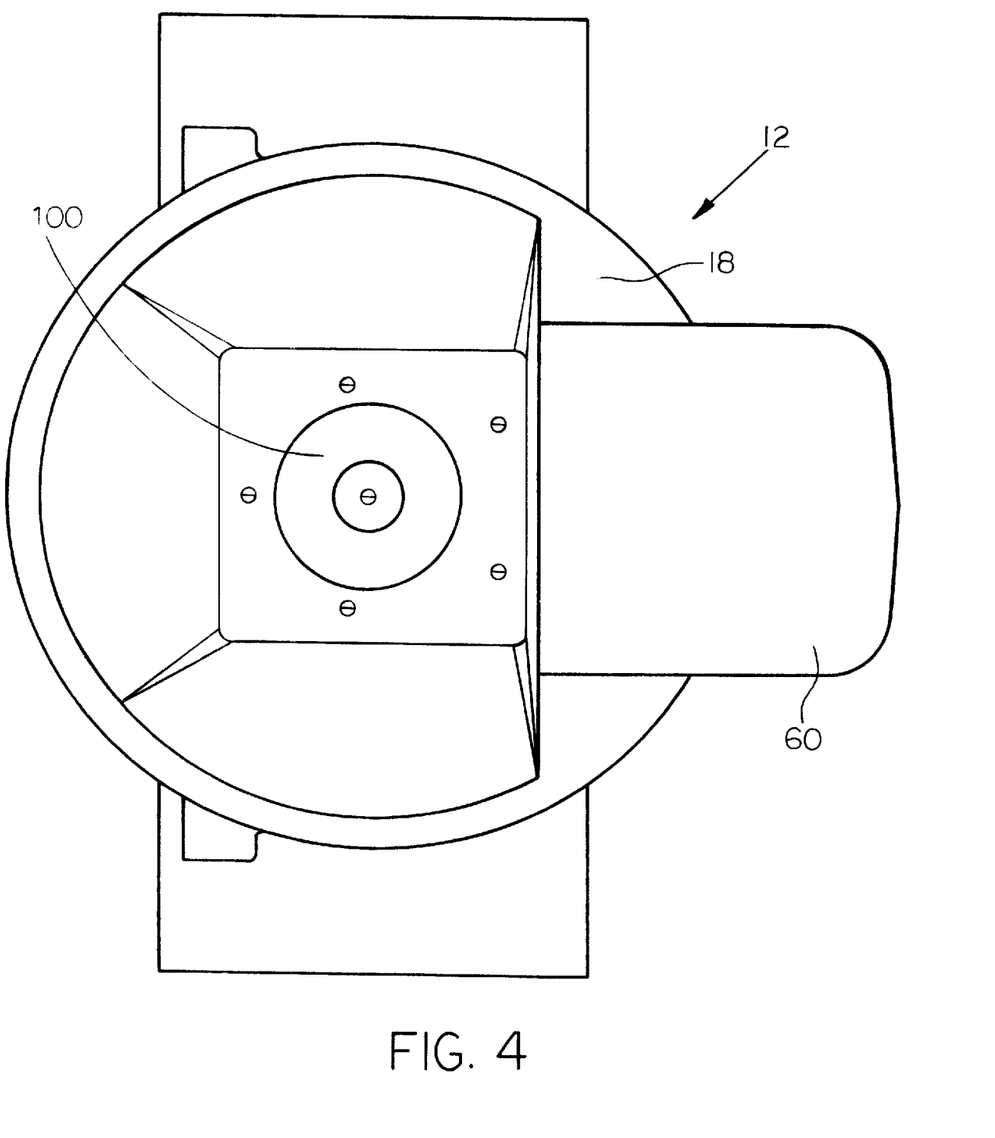
FIG. 4 is a bottom end view of the pump and filter system.

The filter housing (12) is a closed system except for an opening (19) in its bottom (18) or side (16), which is in communication with the tubular element (60), as shown in FIGS. 1, 2 and 4. The filter housing (12) contains a top (14), sides (16) and a bottom (18). The top (14), sides (16) and bottom (18) are generally closed to liquids outside the pump and filter system (10) to prevent effluent from entering the pump and filter system (10) except through the tubular element (60). A discharge system (46) is in communication with the pump (70) and is located generally above the filter element holder (20). This discharge system (46) is designed to pass the filtered effluent out of the septic tank for dispersion.

The filter housing (12) can be made of any material that is generally impervious to the liquids and solids typically present within a septic system. Preferably it is made of a plastic material, such as a polyvinyl chloride, polyethylene or polypropylene-type material.

The tubular element (60) is secured to the outside of the filter housing (12) as shown in FIGS. 1 and 2. This tubular element (60) generally has an opening (62) near or at its top to permit effluent to enter the tubular element (60). The opening (62) in the tubular element (60) is designed to be placed in the relatively clear, horizontal effluent level so that the effluent which flows into this opening (62) does not include components from either the sludge or the scum layers. The size of this opening (62) should be sufficient to permit a good flow of effluent into the system (10). This tubular element (60) can be produced with a precut opening (62) or, in a preferred embodiment, the tubular element (60) is entirely closed when purchased. The installer then cuts the opening (62) into the tubular element (60) at a level so that the opening (62) rests within the relatively clear, horizontal effluent layer. This tubular element (60) is produced from the same types of plastic material as is the filter housing (12), such as polyvinyl chloride, polyethylene, or a polypropylene-type material.

The tubular element (60) is in communication with the filter housing (12). An opening (19) is provided in the bottom (18) or side (16) of the filter housing (12) so that effluent which enters the opening (62) in the tubular element (60) will pass downward through the opening (19) in the bottom (18) or side (16) of the filter housing (12) to be filtered by the filter elements (30).

Figure 5:
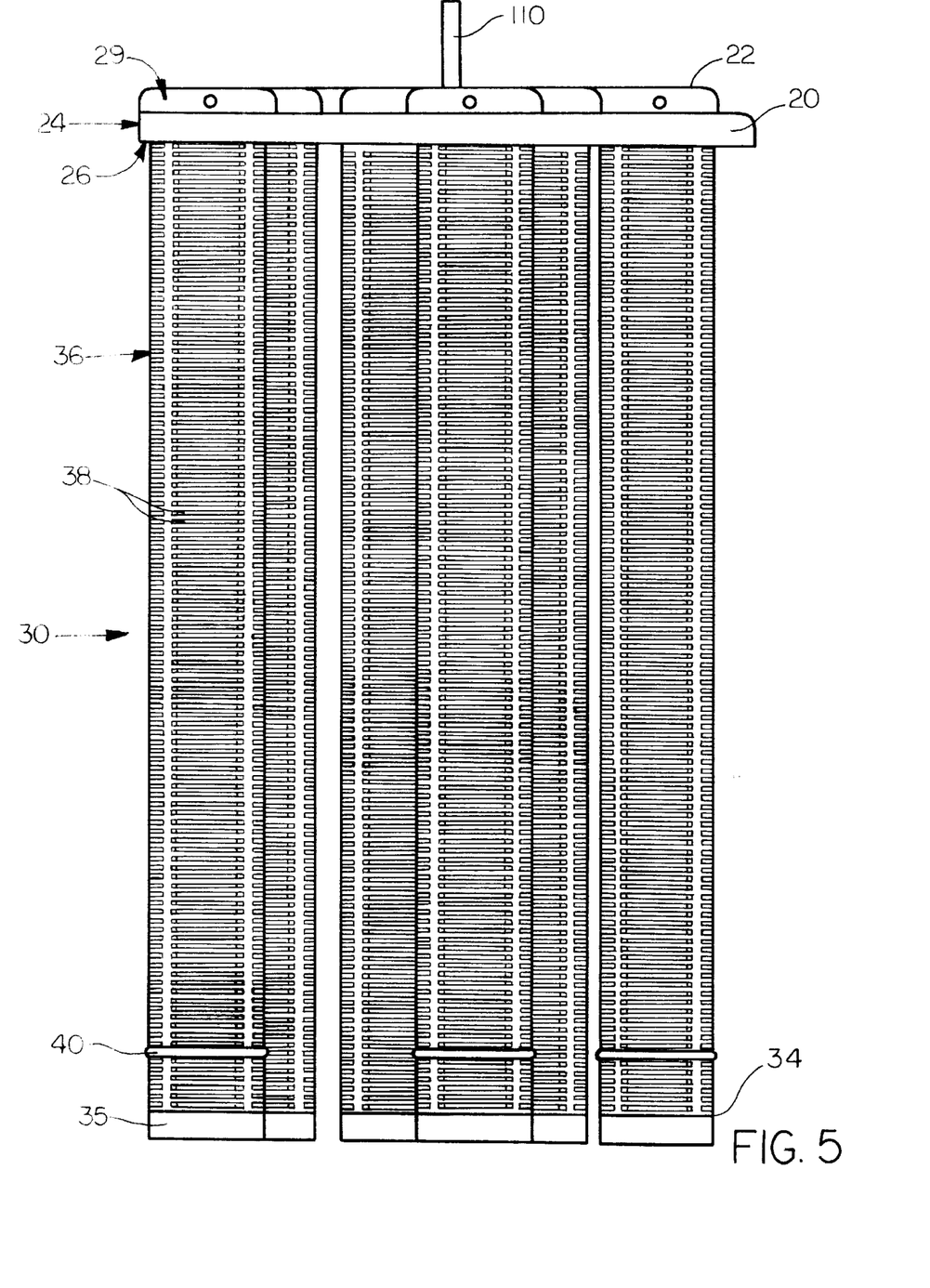
FIG. 5 is a side view of the filter elements secured to the filter element holder.
Figure 6:
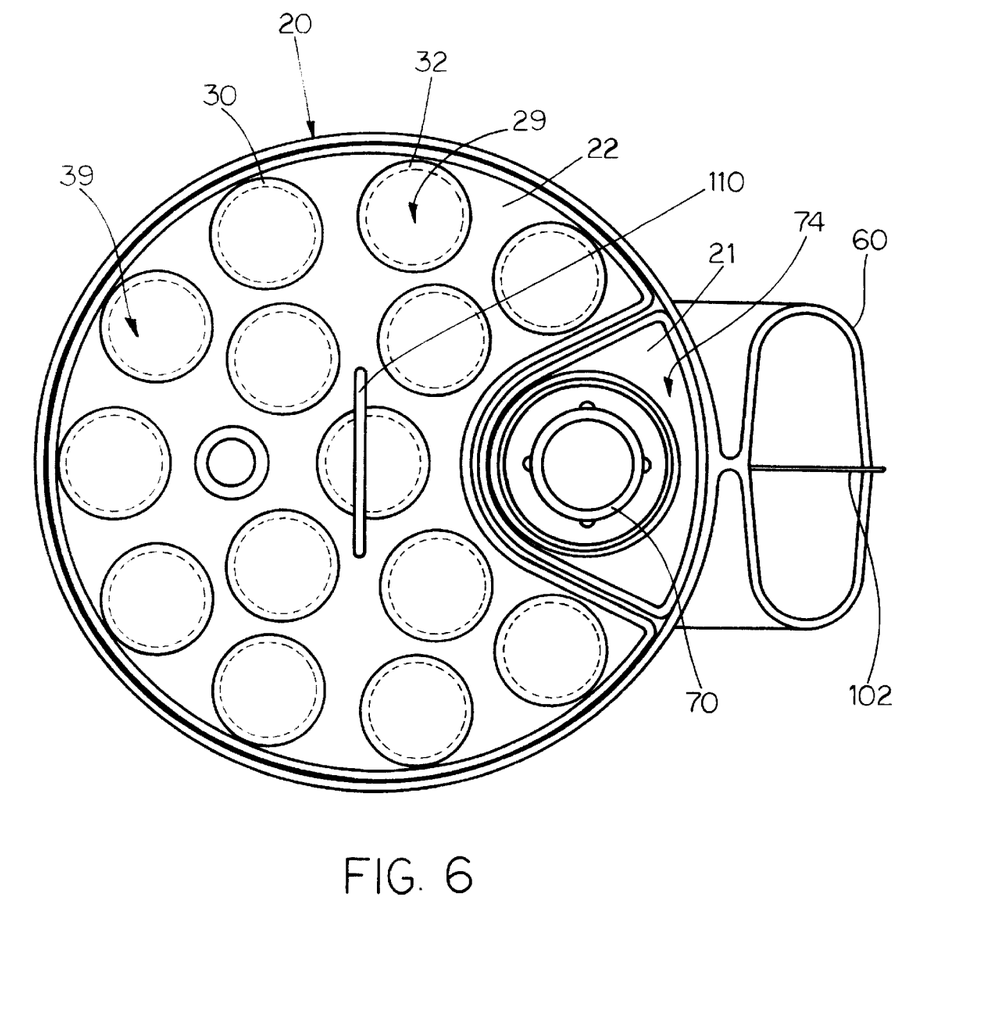
FIG. 6 is a top view of the filter element and pump holder of the pump and filter system along line 6—6.

Secured within the filter housing (12) is the filter element holder (20), as shown in FIGS. 1, 2 and 5. This holder (20) is utilized to hold the filter elements (30), which are discussed in more detail later. The filter element holder (20) is preferably a plate with a top portion (22) and a side portion (24) which extends downward within the filter housing (12). This side portion (24) which extends downward runs parallel to the inside surface of the side (16) of the filter housing (12) and is securely positioned against a shoulder seal (28) set within the inside surface of the filter housing (12). The shoulder seal (28) is preferably an inwardly facing portion of the side (16) of the filter housing (12). The bottom edge (26) of the side portion (24) of the filter element holder (20)

preferably rests on the shoulder seal (28). In a preferred embodiment the filter element holder also contains an opening (21) through which the pump (70) passes, as shown in FIG. 6. When properly secured together, the interaction of the bottom edge (26) of the side portion (24) of the filter element holder (20) and the shoulder seal (28) of the filter housing (12) prevents effluent from passing from below to above the filter element holder (20) without passing first through at least one of the filter elements (30).

Openings (29) are provided in the top portion (22) of the filter element holder (20) to permit the passage of filtered effluent which has passed through the filter elements (30) as shown in FIG. 6. Preferably, these openings (29) in the top portion (22) of the filter element holder (20) line up with openings (39) in the top portion (32) of each of the separate filter elements (30), which are discussed later. By this arrangement, unfiltered effluent is prevented from passing through the filter element holder (20) without first passing through one or more of the filter elements (30).

A plurality of filter elements (30) are secured to the filter element holder (20) as shown in FIG. 5. Although any number of patterns for the arrangement of the filter elements (30) can be utilized, preferably one or more central filter elements (44) are surrounded by a plurality of surrounding filter elements (42). Preferably, a plurality of at least four and as many as ten surrounding filter elements (42) surround the one or more central filter elements (44).

Each of the filter elements (30) is designed to filter effluent which passes from the tubular element (60) through the opening in the bottom (18) or side (16) of the filter housing (12). The size of these filter elements (30) is not particularly critical as long as they are efficient in filtering solids which may enter the pump and filter system (10). Preferably, the filter elements (30) are from about 2 to about 8 inches in diameter and from about 4 to about 30 inches in height.

Any design of the components of the filter elements (30) for filtering of the effluent may be utilized. In one preferred embodiment, the filtering is performed by a plurality of horizontal filtering slots (38) cut into the sides (36) of the filter elements (30) as shown in FIG. 5. Preferably, there are a series of four groups of horizontal filtering slots (38) around each filter element (30), extending from the bottom (34) of each filter element (30) to its top (32). Preferably, the slots (38) are no more than about 0.01 inch (0.02 cm) to about 0.25 inch (0.60 cm) in width to be efficient in filtering solids trapped in the liquid effluent.

It is important that the bottom end (34) of each filter element (30) be closed. By closing the bottom end (34) of each filter element (30), the unfiltered liquid effluent must pass through the sides (36) of each filter element (30), through its filtering slots (38) and then out through the top (32) of each filter element (30). In one preferred embodiment the bottom end (34) of each filter element is closed with a cap (35) secured to the filter element (30) to prevent the flow of effluent through the bottom of the filter element (30) as shown in FIG. 5. The top (32) of each filter element (30) is open to permit discharge of the filtered effluent out of the filter elements (30). As previously discussed, openings (29) are provided in the filter element holder (20) which correspond to the openings (39) in the top portion (32) of the filter elements (30) to permit the free flow of the filtered effluent out of the filter housing (12). In addition, there are no other openings in the filter element holder (20), other than is associated with the pump (70), so that the unfiltered effluent may not pass through the filter element holder (20) without first passing through the filtering slots (38) of the filter elements (30).

In order to maintain a consistent flow of effluent through the system, a separation element is provided to separate the various filter elements (30) from each other as shown in FIGS. 1, 2 and 5. This separation element is preferably secured to several of the filter elements (30) and is located a portion of the way above the bottom (34) of the filter elements (30). In one preferred embodiment, this separation element is a separating ring (40) which is secured to one or more of the filter elements (30). The size and width of this separating ring (40) is not particularly critical as long as it is of sufficient size to assure that some or all of the filter elements (30) do not contact each other. In a preferred embodiment this separating ring (40) has an inner diameter approximately equal to the outer diameter of the filter elements (30) and an outer diameter at least about 0.5 inch (1.2 cm) greater than its inner diameter. In addition, in order that the flow of the effluent through the filter elements (30) is not unduly impeded by these rings (40), the separating rings (40) are narrow, less than about 0.5 inch (1.2 cm) in height, and are secured at least about 10 percent and preferably about 25 percent of the distance above the bottom (34) of the filter elements (30). By placing the separating ring (40) a sufficient distance above the bottom (34) of the filter elements (30), the flow of the effluent into the filter elements (30) is not significantly impeded. If preferred, additional rings (40) may be placed at different heights up the sides (36) of the various filter elements (30) to assist in preventing contact of the filter elements (30) with each other.

In a further embodiment which is not shown, in order to further enhance the filtering ability of the filter elements (30), the length of one or more of the central filter element (44) may be extended at least about 20 percent longer than that of the surrounding filter elements (42) such that the central filter element (44) extends downward into the effluent further than the surrounding filter elements (42).

The pump (70) that is utilized with the pump and filter system (10) is preferably an elongated, vertical pump as shown in FIGS. 1, 2 and 3. For example, acceptable pumps of this type are supplied by Zoeller Company. The pump (70) sets generally near or on the bottom (18) of the filter housing (12) and extends upward through the filter element holder (20). It is attached to piping (72) which discharges the filtered effluent from the pump and filter system (10). While the pump (70) extends through the filter element holder (20), it is designed so that the effluent which is filtered through the filter elements (30) passes over the top portion (22) of the filter element holder (20) downward around the pump (70) into a shaft (74) located around the pump (70) to or near the bottom (18) of the filter housing (12). One or more openings (76) are provided in the bottom of the pump (70) through which the filtered effluent enters. When the level of the effluent within the filter housing (12) reaches a certain level, the pump (70) is activated and pumps out a predetermined quantity of the filtered effluent.

There is also placed within the filter housing (12) a control system to activate the pump (70). Preferably this control system contains a float system (82) comprised of an "on" float (84) and an "off" float (86), such as is shown on FIG. 1. The industry also recommends that a redundant "off" float (88) be utilized as a backup to the off float (86). This float system (82) is slidably engaged to a shaft (50) which extends from the top (14) of the filter housing (12) to the filter element holder (20). The shaft is preferably manufactured from pvc piping. As the filtered effluent located above the filter element holder (20) rises, the on float (84), the off float (86) and the redundant off float (88) of the float system (82) rises until the on float (84) reaches a level which activates a switch to activate the pump (70). In normal operation, the pump (70) then pumps the filtered effluent out of the septic tank until the off float (86) of the float system (82) drops to a predetermined point which then deactivates the pump (70). The redundant off float (88) acts as a backup to the off float (86) if the off float (86) fails to deactivate the pump (70).

In a preferred embodiment there is also provided an alarm control system (90) secured to the shaft (50) as shown on FIG. 1, which includes an alarm float (92), designed such that if the alarm float (92) of the alarm control system rises to a certain level, a signal is sent through an alarm box (94) to the property owner, stating that a problem exists within the pump and filter system (10). This type of float system (82) and alarm system is conventional and is manufactured by Zoeller Company.

Preferably, a check valve (100) is secured within the bottom (18) of the filter housing (12) as shown in FIGS. 1, 2 and 4. Secured to this check valve is a lifting element, such as a flexible wire or chain (102), which extends to the top (14) of the filter housing. When this flexible wire or chain (102) is pulled, it opens the check valve (100) to allow solids which have accumulated in the bottom (18) of the filter housing (12) to be flushed out of the filter housing (12) when maintenance is performed on the pump and filter system (10). The check valve (100) is preferably a conventional flapper valve such as is manufactured by Zoeller Company.

The filter elements (30) secured to the filter element holder (20) of the filter housing may be removed and cleaned. Preferably, there is a handle (110) on the top of the filter element holder (20), as shown in FIG. 5, which can be utilized to remove the filter element holder (20) and filter element (30) from the pump and filter system (10) for cleaning.

In operation, unfiltered effluent flows from the generally liquid, effluent layer through the opening (62) in the tubular element (60) downward through the opening (19) in the bottom (18) or side (16) of the filter housing (12) where it encounters the bottoms (34) of the filter elements (30). As the bottom (34) of each of the filter elements (30) is closed, preferably by a cap (35), the effluent flows around to the sides (36) of the filter element (30) where it passes through the filtering slots (38) in the sides (36) of the filter elements (30), to the inside of each filter element (30). After the effluent passes through the filtering slots (38) inside the filter elements (30), it passes upward and out the opening (39) in the top of the filter elements (20) and through the cooperating opening (29) in the filter element holder (20). Unfiltered effluent may not pass through the filter elements (30) or through the filter element holder (20) without first passing through the filtering slots (38) in the filter elements (30) because there are no openings in the filter element holder (20) that do not correspond to openings (39) in the top portions (32) of the various filter elements (30) other than into the pump shaft (74) around the pump (70). Because of a separation ring (40) or rings (40) secured around one or more of the filter elements (30), the filter elements (30) are prevented from contacting each other, thereby increasing the flow potential of the effluent among the filter elements (30).

After the effluent passes through the openings (39) in the top of the filter elements and the openings (29) in the filter element holder (20), it then passes into the pump shaft (74) provided around the pump (70). The filtered effluent passes down this pump shaft (74) until it enters the pump (70) through an opening (76) or openings near the bottom of the pump (70). In a preferred embodiment, as the filtered effluent fills up that portion of the filter housing (12) located above the filter element holder (20), it activates the on float (84) of the float system (82) which then activates the pump (70) when sufficient filtered effluent is present. After a sufficient amount of filtered effluent has been pumped from the filter housing (12), the off float (86) or redundant off float (88) of the float system (82) deactivates the pump (70), awaiting the next pumping cycle. The filtered effluent passes out piping (72) to the discharge system (46) attached to the pump (70) to be discharged into lateral fields associated with the septic tank.

The filter elements (30) can be checked and cleaned by removing the float system (82), the filter elements (30) and the filter element holder (20) from the filter housing (12) using the handle (110). At this same time, the check valve (100) may be opened to permit accumulated particulates to be discharged from the pump and filter housing (10).

I claim:

1. A pump and filter system for filtering effluent contained within a septic tank containing liquids and solids, wherein the liquids and solids are distributed within the septic tank into an upper scum layer, a lower sludge layer and a relativey clear, effluent layer located between the scum layer and the sludge layer, wherein the system comprises:

(a) a filter housing with sides, a top and a bottom;

(b) a filtering system secured within the filter housing;

(c) a substantially tubular element secured to an outside of the filter housing containing a side opening, wherein said opening receives unfiltered effluent from the relatively clear, effluent layer within the septic tank and wherein the tubular element is in liquid communication through its bottom end thereof with an opening in the bottom of the filter housing; and (d) a pump for pumping effluent filtered through the filtering system secured within the filter housing.

2. The pump and filter system of claim 1 wherein the filtering system comprises a plurality of filter elements secured to a filter element holder.

3. The pump and filter system of claim 2 wherein each filter element comprises a top, side and bottom, wherein the bottom of each filter element is closed to prevent the flow of effluent through said bottom of the filter element and wherein each filtering element contains slots for filtering solids from the effluent.

4. The pump and filter system of claim 3 wherein the filter elements contain an opening in their tops through which filtered effluent passes.

5. The pump and filter system of claim 2 wherein the pump is placed at the level of the filter elements of the filtering system.

6. The pump and filter system of claim 5 wherein the pump contains an opening located near its bottom.

7. The pump and filter system of claim 2 wherein a separation element is secured among the filter elements.

8. The pump and filter system of claim 1 further comprising a discharge opening in the filter housing for discharging filtered effluent from the filter housing.

9. The pump and filter system of claim 1 wherein the tubular element opening is located in the element at a selected vertical level.

10. The pump and filter system of claim 1 further comprising a check valve located in the bottom of the filter housing.

11. The pump and filter system of claim 1 further comprising a shoulder seal inside the sides of the filter housing.

12. The pump and filter system of claim 11 wherein a portion of the filtering system rests against the shoulder seal.

13. The pump and filter system of claim 1 further comprising an alarm system secured within the filter housing above the filtering system.

14. The pump and filter system of claim 1 further comprising a pump control system secured above the filtering system within the filter housing.

* * * * *